United States Patent
Kim et al.

(10) Patent No.: US 10,621,473 B1
(45) Date of Patent: Apr. 14, 2020

(54) METHOD FOR PROVIDING OBJECT DETECTING SYSTEM CAPABLE OF UPDATING TYPES OF DETECTABLE CLASSES IN REAL-TIME BY USING CONTINUAL LEARNING AND DEVICES USING THE SAME

(71) Applicant: Stradvision, Inc., Pohang-si, Gyeongsangbuk-do (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/723,652

(22) Filed: Dec. 20, 2019

Related U.S. Application Data

(60) Provisional application No. 62/798,761, filed on Jan. 30, 2019.

(51) Int. Cl.
| | |
|---|---|
| *G06K 9/62* | (2006.01) |
| *G06K 9/20* | (2006.01) |
| *G06N 3/08* | (2006.01) |
| *G06N 3/04* | (2006.01) |

(Continued)

(52) U.S. Cl.
CPC ........... *G06K 9/6259* (2013.01); *G06F 16/55* (2019.01); *G06K 9/2054* (2013.01);
(Continued)

(58) Field of Classification Search
CPC .. G06K 9/6259; G06K 9/6232; G06K 9/2054; G06K 9/00805; G06K 2209/21; G06N 3/04; G06N 3/08; G06F 16/55
See application file for complete search history.

(56) References Cited

U.S. PATENT DOCUMENTS

| | | | |
|---|---|---|---|
| 9,996,768 B2* | 6/2018 | Shen | G06K 9/4628 |
| 2008/0260239 A1* | 10/2008 | Han | G06K 9/00248 |
| | | | 382/156 |

(Continued)

*Primary Examiner* — John B Strege
(74) *Attorney, Agent, or Firm* — Kaplan Breyer Schwarz, LLP

(57) ABSTRACT

A method for updating an object detecting system to detect objects with untrained classes in real-time is provided. The method includes steps of: (a) the object detecting system, if at least one input image is acquired, instructing a recognizer included therein to generate a specific feature map, and to generate a specific query vector; (b) the object detecting system instructing a similarity determining unit (i) to compare the specific query vector to data vectors, to thereby calculate each of first similarity scores between the specific query vector and each of the data vectors, and (ii) to add a specific partial image to an unknown image DB, if a specific first similarity score is smaller than a first threshold value; (c) the object detecting system, if specific class information is acquired, instructing a short-term update unit to generate a specific short-term update vector, and update the feature fingerprint DB.

18 Claims, 4 Drawing Sheets

(51) Int. Cl.
  *G06F 16/55* (2019.01)
  *G06K 9/00* (2006.01)
(52) U.S. Cl.
  CPC .......... *G06K 9/6232* (2013.01); *G06N 3/04* (2013.01); *G06N 3/08* (2013.01); *G06K 9/00805* (2013.01); *G06K 2209/21* (2013.01)

(56) References Cited

U.S. PATENT DOCUMENTS

| | | | | |
|---|---|---|---|---|
| 2009/0324020 A1* | 12/2009 | Hasebe | ............. | G06K 9/00228 382/115 |
| 2013/0163830 A1* | 6/2013 | Matsushita | ........ | G06K 9/00288 382/118 |
| 2014/0226877 A1* | 8/2014 | Je | ....................... | G06K 9/00288 382/118 |
| 2016/0048741 A1* | 2/2016 | Nguyen | ............... | G06K 9/6256 382/159 |
| 2016/0104058 A1* | 4/2016 | He | ....................... | G06K 9/6255 382/156 |
| 2017/0372174 A1* | 12/2017 | Wshah | ................ | G06N 3/0454 |
| 2018/0060698 A1* | 3/2018 | Hua | ................... | G06K 9/6257 |
| 2019/0108408 A1* | 4/2019 | Chen | .................. | G06K 9/00892 |
| 2019/0251334 A1* | 8/2019 | Kawase | ............. | G06K 9/00268 |
| 2019/0318171 A1* | 10/2019 | Wang | ................ | G06K 9/00771 |
| 2019/0392248 A1* | 12/2019 | Zhang | ..................... | G06N 3/08 |
| 2020/0034645 A1* | 1/2020 | Fan | ........................ | G06N 20/00 |
| 2020/0042550 A1* | 2/2020 | Chang | ............... | G06Q 50/01 |
| 2020/0050887 A1* | 2/2020 | Gautam | ............. | G06K 9/00624 |

\* cited by examiner

METHOD FOR PROVIDING OBJECT DETECTING SYSTEM CAPABLE OF UPDATING TYPES OF DETECTABLE CLASSES IN REAL-TIME BY USING CONTINUAL LEARNING AND DEVICES USING THE SAME

CROSS REFERENCE OF RELATED APPLICATION

This present application claims the benefit of the earlier filing date of provisional patent application No. 62/798,761, filed Jan. 30, 2019, the entire contents of which are incorporated herein by reference.

FIELD OF THE DISCLOSURE

The present disclosure relates to a method and a device for use with an autonomous vehicle; and more particularly, to the method and the device for providing an object detecting system capable of updating in real-time types of detectable classes.

BACKGROUND OF THE DISCLOSURE

Deep Convolutional Neural Networks (Deep CNNs) are at the heart of the remarkable development in deep learning. CNNs have already been used in the 90's to solve problems of character recognition, but their use has become as widespread as it is now thanks to recent researches. These CNNs have won the 2012 ImageNet image classification tournament, crushing other competitors. Then, the convolutional neural network became a very useful tool in the field of the machine learning.

Recently, the CNNs have been widely used in autonomous driving. The CNNs can perform various functions to support the autonomous driving, such as semantic segmentation, object detection, etc., for autonomous vehicles, which are learned by using tens of thousands of training data sets, and then installed on the autonomous vehicles.

Meanwhile, when the autonomous vehicles have been used for a long time, problems may arise. One of them is that new objects that have not existed during learning are added to the road over time, so that the CNN cannot properly function as an object detector. For example, new vehicles are released every year and their designs change, in which case the object detector may not be able to detect these new vehicles as vehicles. Therefore, the CNN installed on the autonomous vehicle needs to be updated regularly. However, the learning process for updating parameters of the CNN is costly and the transferring process of the parameters and related information to each autonomous vehicle for updating is also costly.

SUMMARY OF THE DISCLOSURE

It is an object of the present disclosure to solve all the aforementioned problems.

It is another object of the present disclosure to allow safe driving of an autonomous vehicle which has been operated for a long period of time by providing an object detecting system capable of updating types of detectable classes in real-time.

In accordance with one aspect of the present disclosure, there is provided a method for updating an object detecting system to detect objects with untrained classes in real-time, including steps of: (a) the object detecting system, if at least one input image is acquired, instructing a recognizer included therein to generate a specific feature map corresponding to a specific ROI including a specific object of the input image, and to generate a specific query vector corresponding to the specific object by using the specific feature map; (b) the object detecting system instructing a similarity determining unit (i) to compare the specific query vector to one or more data vectors included in at least one feature fingerprint DB, which is used for detecting objects of images to be inputted thereto, to thereby calculate each of one or more first similarity scores between the specific query vector and each of the data vectors, and (ii) to add a specific partial image corresponding to the specific ROI to an unknown image DB, which is used for updating the feature fingerprint DB, if a specific first similarity score, which is the largest among the first similarity scores, is smaller than a predetermined first threshold value; (c) the object detecting system, if specific class information corresponding to the specific partial image is acquired, instructing a short-term update unit to generate a specific short-term update vector corresponding to the specific object by using the specific class information and a specific element vector corresponding to the specific object, generated by the recognizer, and update the feature fingerprint DB by using the specific short-term update vector.

As one example, at the step of (c), the object detecting system instructs the short-term update unit (i) to calculate each of one or more second similarity scores between the specific short-term update vector and specific data vectors, among the data vectors, whose class information is same as that of the specific short-term update vector, (ii) to select a largest one among the second similarity scores, (iii-1) if the largest second similarity score is larger than or same as a predetermined second threshold value, to update a target data vector corresponding to the largest second similarity score by using the specific short-term update vector, and (iii-2) if the largest second similarity score is smaller than the second threshold value, to add the specific short-term update vector to the feature fingerprint DB, to thereby update the feature fingerprint DB.

As one example, at the step of (c), the object detecting system, if the largest second similarity score is larger than or same as the second threshold value, (1) instructs the short-term update unit to compare each of target elements, including a first target element to an N-th element, included in the target data vector, with each of update elements, including a first update element to an N-th update element, included in the specific short-term update vector, and (2) instructs the short-term update unit to (i) substitute a K-th target element, wherein K is an integer between 1 and N, with a K-th update element, if the K-th target element corresponds to a first notation representing non-existence of data while the K-th update element corresponds to a second notation representing a certain value, (ii) maintain the K-th target element, if the K-th target element corresponds to the second notation while the K-th update element corresponds to the first notation, (iii) update the K-th target element with a weighted sum of the K-th target element and the K-th update element if the K-th target element and the K-th update element both correspond to the second notation, and (iv) maintain the K-th target element, if the K-th target element and the K-th update element both correspond to the first notation.

As one example, at the step of (c), the object detecting system instructs the short-term update unit to add the specific short-term update vector to the feature fingerprint DB if there are no specific data vectors, among the data vectors, whose class information is same as that of the specific short-term update vector.

As one example, the method further includes a step of: (d) the object detecting system instructing a long-term update unit to generate one or more long-term update vectors corresponding to one or more partial images, including the specific partial image, and their corresponding class information representing classes of one or more objects included therein, which were stored in at least one known image DB after used by the short-term update unit, and to further update the feature fingerprint DB by using the long-term update vectors, wherein each of the long-term update vectors includes a reference part including one or more values generated by the recognizer using each of the partial images and a class part including at least one value representing each of the class information.

As one example, at the step of (d), the object detecting system instructs the long-term update unit (i) to calculate one or more third similarity scores among each of the long-term update vectors, (ii) to merge some of the long-term update vectors whose class information is same as each other in order to generate one or more integrated long-term update vectors, and add the integrated long-term update vectors and remaining long-term update vectors which were not merged, to the feature fingerprint DB, to thereby update the feature fingerprint DB.

As one example, at the step of (b), the object detecting system instructs the similarity determining unit to calculate one of the first similarity scores by using a formula below:

$$S = e^{-|Q-D|}$$

wherein Q is the specific query vector and D is one of the data vectors.

As one example, at the step of (a), the object detecting system (i) instructs an RPN corresponding to the recognizer to detect the specific ROI included in the input image, (ii) instructs one or more keypoint detectors corresponding to the recognizer to detect one or more key regions on the specific partial image corresponding to the specific ROI, (iii) instructs a feature extractor corresponding to the recognizer to generate the specific feature map by using the specific partial image, and (iv) instructing the recognizer to generate the specific query vector by using values corresponding to the key regions in the specific feature map.

As one example, the feature extractor includes one or more convolutional layers having one or more convolutional neurons, and it extracts the specific feature map from the specific partial image by instructing each of the convolutional neurons to apply convolutional operations to its inputted values by using its own parameters and deliver its results to its next neuron, and wherein the parameters are determined through training processes performed before the step (a).

In accordance with another aspect of the present disclosure, there is provided an object detecting system capable of updating itself to detect objects with untrained classes in real-time, including: at least one memory that stores instructions; and at least one processor configured to execute the instructions to perform processes of: (I) if at least one input image is acquired, instructing a recognizer included therein to generate a specific feature map corresponding to a specific ROI including a specific object of the input image, and to generate a specific query vector corresponding to the specific object by using the specific feature map; (II) instructing a similarity determining unit (i) to compare the specific query vector to one or more data vectors included in at least one feature fingerprint DB, which is used for detecting objects of images to be inputted thereto, to thereby calculate each of one or more first similarity scores between the specific query vector and each of the data vectors, and (ii) to add a specific partial image corresponding to the specific ROI to an unknown image DB, which is used for updating the feature fingerprint DB, if a specific first similarity score, which is the largest among the first similarity scores, is smaller than a predetermined first threshold value; (III) if specific class information corresponding to the specific partial image is acquired, instructing a short-term update unit to generate a specific short-term update vector corresponding to the specific object by using the specific class information and a specific element vector corresponding to the specific object, generated by the recognizer, and update the feature fingerprint DB by using the specific short-term update vector.

As one example, at the process of (III), the processor instructs the short-term update unit (i) to calculate each of one or more second similarity scores between the specific short-term update vector and specific data vectors, among the data vectors, whose class information is same as that of the specific short-term update vector, (ii) to select a largest one among the second similarity scores, (iii-1) if the largest second similarity score is larger than or same as a predetermined second threshold value, to update a target data vector corresponding to the largest second similarity score by using the specific short-term update vector, and (iii-2) if the largest second similarity score is smaller than the second threshold value, to add the specific short-term update vector to the feature fingerprint DB, to thereby update the feature fingerprint DB.

As one example, at the process of (III), the processor, if the largest second similarity score is larger than or same as the second threshold value, (I) instructs the short-term update unit to compare each of target elements, including a first target element to an N-th element, included in the target data vector, with each of update elements, including a first update element to an N-th update element, included in the specific short-term update vector, and (II) instructs the short-term update unit to (i) substitute a K-th target element, wherein K is an integer between 1 and N, with a K-th update element, if the K-th target element corresponds to a first notation representing non-existence of data while the K-th update element corresponds to a second notation representing a certain value, (ii) maintain the K-th target element, if the K-th target element corresponds to the second notation while the K-th update element corresponds to the first notation, (iii) update the K-th target element with a weighted sum of the K-th target element and the K-th update element if the K-th target element and the K-th update element both correspond to the second notation, and (iv) maintain the K-th target element, if the K-th target element and the K-th update element both correspond to the first notation.

As one example, at the process of (III), the processor instructs the short-term update unit to add the specific short-term update vector to the feature fingerprint DB if there are no specific data vectors, among the data vectors, whose class information is same as that of the specific short-term update vector.

As one example, the processor is configured to further perform a process of: (IV) instructing a long-term update unit to generate one or more long-term update vectors corresponding to one or more partial images, including the specific partial image, and their corresponding class information representing classes of one or more objects included therein, which were stored in at least one known image DB after used by the short-term update unit, and to further update the feature fingerprint DB by using the long-term update vectors, wherein each of the long-term update vectors includes a reference part including one or more values generated by the recognizer using each of the partial images and a class part including at least one value representing each of the class information.

As one example, at the process of (IV), the processor instructs the long-term update unit (i) to calculate one or more third similarity scores among each of the long-term update vectors, (ii) to merge some of the long-term update vectors whose class information is same as each other in order to generate one or more integrated long-term update vectors, and add the integrated long-term update vectors and remaining long-term update vectors which were not merged, to the feature fingerprint DB, to thereby update the feature fingerprint DB.

As one example, at the process of (II), the processor instructs the similarity determining unit to calculate one of the first similarity scores by using a formula below:

$$S = e^{-|Q-D|}$$

wherein Q is the specific query vector and D is one of the data vectors.

As one example, at the process of (I), the processor (i) instructs an RPN corresponding to the recognizer to detect the specific ROI included in the input image, (ii) instructs one or more keypoint detectors corresponding to the recognizer to detect one or more key regions on the specific partial image corresponding to the specific ROI, (iii) instructs a feature extractor corresponding to the recognizer to generate the specific feature map by using the specific partial image, and (iv) instructing the recognizer to generate the specific query vector by using values corresponding to the key regions in the specific feature map.

As one example the feature extractor includes one or more convolutional layers having one or more convolutional neurons, and it extracts the specific feature map from the specific partial image by instructing each of the convolutional neurons to apply convolutional operations to its inputted values by using its own parameters and deliver its results to its next neuron, and wherein the parameters are determined through training processes performed before the process (I).

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
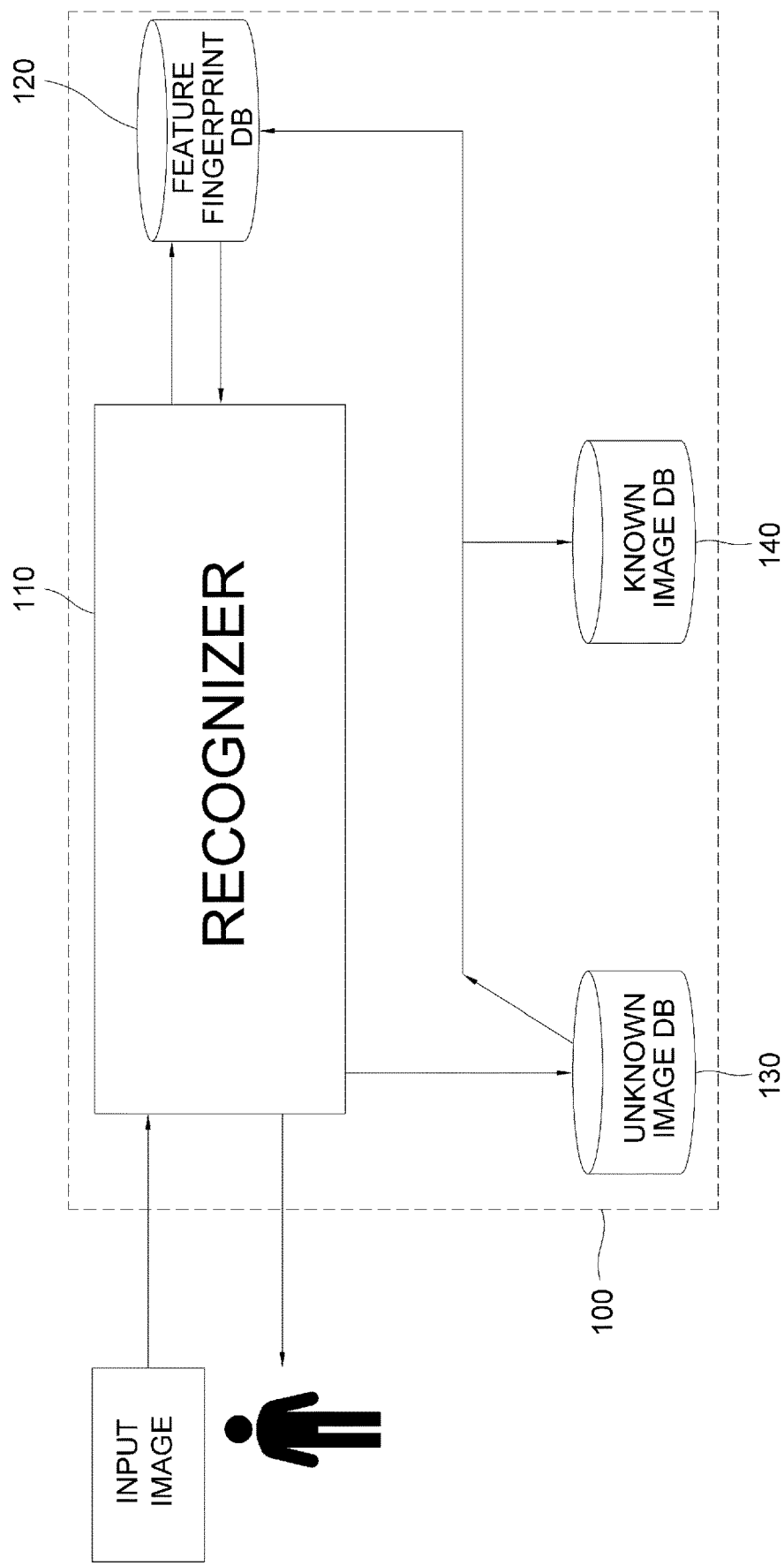
FIG. 1 is a drawing schematically illustrating a configuration of an object detecting system which performs a method for providing the object detecting system capable of updating types of detectable classes in real-time in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of an object detecting system which performs a method for providing the object detecting system capable of updating types of detectable classes in real-time in accordance with one example embodiment of the present disclosure.

By referring to FIG. 1, the object detecting system 100 may include a recognizer 110, a feature fingerprint DB 120, an unknown image DB 130, and a known image DB 140, which are described later. Processes of input/output and computations of the recognizer 110, the feature fingerprint DB 120, the unknown image DB 130, and the known image DB 140 may be respectively performed by a communication part and a processor included in the object detecting system 100. Also, a memory (not illustrated) in the object detecting system 100 may have stored various instructions to be described later, and the processor (not illustrated) may execute the instructions stored in the memory (not illustrated) and may perform processes of the present disclosure by executing the instructions to be disclosed later. Such description of the object detecting system 100 does not exclude an integrated device including any combination of a processor, a memory, a medium, or any other computing components.

Further, the object detecting system 100 may include a similarity determining unit (not illustrated), a short-term update unit (not illustrated), and a long-term update unit (not illustrated).

Specifically, the recognizer 110 may generate (i) location information of the objects on at least one input image and (ii) at least one feature map of ROIs including the location information, and then may generate each of query vectors of each of the objects by referring to each feature map. The feature fingerprint DB 120 may store data vectors to be for deriving class information of the objects corresponding to the query vectors by a comparison between the data vectors and the query vectors. The unknown image DB 130 may store part, corresponding to an object, of the input image, for updating types of classes which may be detected by the object detecting system 100 in the future, in case the feature fingerprint DB 120 does not have a data vector whose similarity score to the query vector corresponding to the object is equal to or greater than a first prescribed threshold. The known image DB 140 may store (i) one or more partial images, which may be images each of which is precisely bounding an unidentified object, inputted into the object detecting system 100 and (ii) their corresponding information confirmed by a programmer and inputted thereinto, for a long-term update to be described later.

Further, the object detecting system 100 may include (i) a similarity determining unit (not illustrated), which may compare query vectors with data vectors included in the feature fingerprint DB 120, to be explained later, (ii) a short-term update unit (not illustrated), and (iii) a long-term update unit (not illustrated). Such units can be configured as either software or hardware.

A configuration of the object detecting system 100 capable of updating the types of the detectable classes in real-time in accordance with one example embodiment of the present disclosure is described above, and methods for detecting the objects in the input image, for the short-term update, and for the long-term update of the object detecting system 100 will be described. This is explained by referring to FIG. 2.

Figure 2:
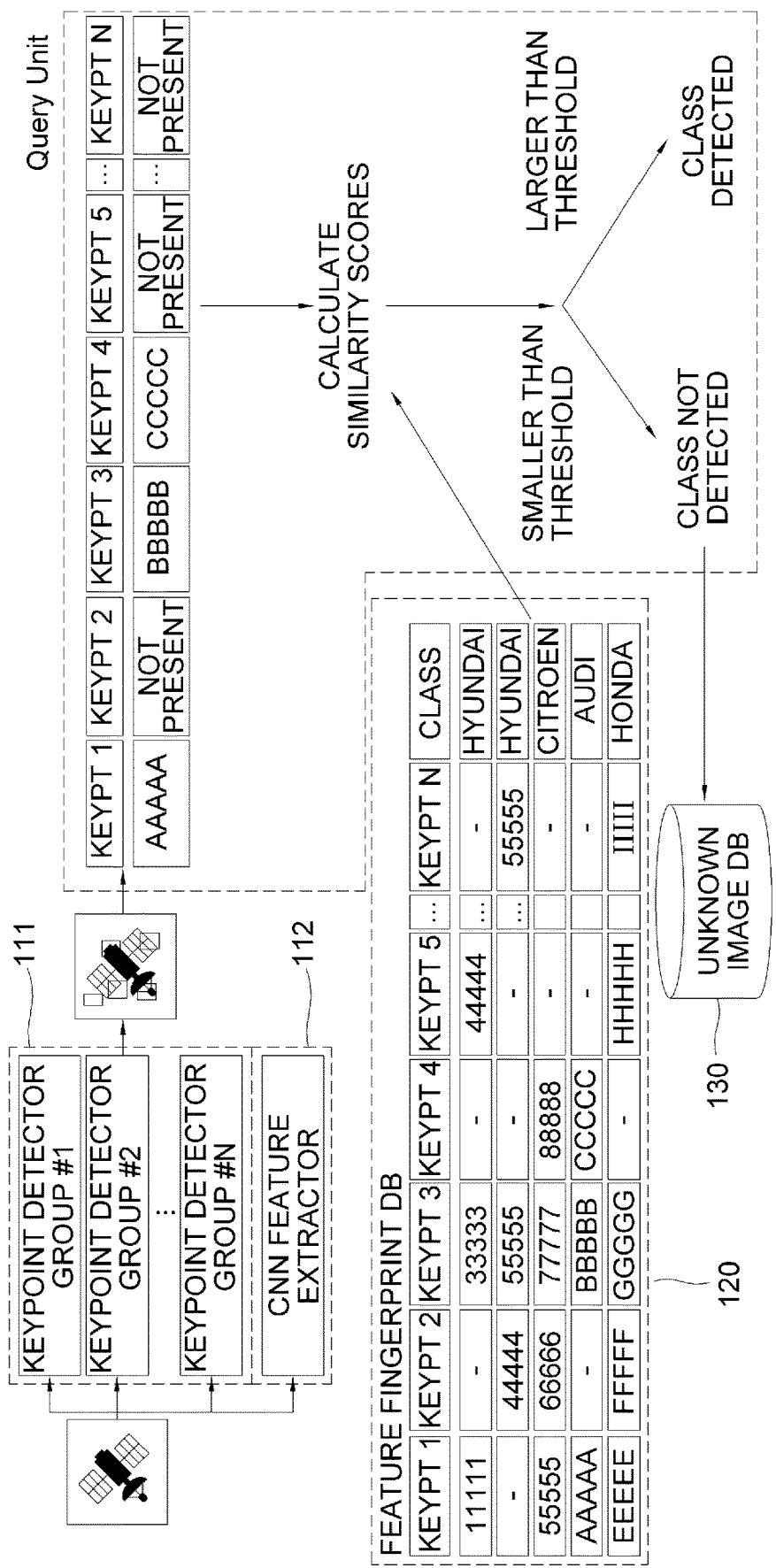
FIG. 2 is a drawing schematically illustrating a process of detecting the classes of each of objects in at least one image by the object detecting system capable of updating the types of the detectable classes in real-time in accordance with one example embodiment of the present disclosure.

FIG. 2 is a drawing schematically illustrating a process of detecting the classes of each of objects in the input image by the object detecting system 100 capable of updating the types of the detectable classes in real-time in accordance with one example embodiment of the present disclosure.

By referring to FIG. 2, N keypoint detectors 111 and a feature extractor 112 included in the recognizer 110 are shown. The keypoint detectors 111 may detect at least one key region on its input image. The key region is very important for detecting the objects. This is because the classes are detected by a comparison between at least one feature of the key region and features stored in the feature fingerprint DB 120, as will be described later. The keypoint detectors 111 may have been learned beforehand. The feature extractor 112 may apply one or more convolution operations to the input image, to thereby generate at least one feature map. The feature extractor may also have been learned beforehand. For example, the feature extractor may include one or more convolutional layers including one or more convolutional neurons. And it may extract a feature map from its inputted image by instructing each of the convolutional neurons to apply convolutional operations to its inputted values by using its own parameters and deliver its results to its next neuron. The parameters can be determined through training processes before the processes of the present invention are started.

If the input image is acquired, the object detecting network may instruct at least one RPN to generate one or more ROIs of the input image, and may generate each of the partial images by cropping each of regions, corresponding to the each of the ROIs, on the input image. Or, the input image itself may be an image including a single object, like each of the partial images. Thereafter, the recognizer 110 may generate a specific query vector corresponding to a specific partial image, and for this purpose, the recognizer 110 may instruct its keypoint detectors (included in the recognizer 110) to detect the key regions on the specific partial image. Also, the recognizer 110 may instruct the feature extractor to generate at least one specific feature map corresponding to the specific partial image. Thereafter, the recognizer 110 may instruct a query unit to generate a specific query vector by using values, on the specific feature map, corresponding to each of the key regions on the specific partial image which are detected by each of the keypoint detectors. Herein, each of the values corresponding to each of the keypoint detectors may be located on each corresponding position on the specific query vector. FIG. 2 shows one example of such a process. The components of an example query vector in FIG. 2 indicating "not present" may represent that each of the keypoint detectors corresponding to each of the components cannot find each of the key regions corresponding to each of the keypoint detectors on the input image. Other query vectors corresponding to partial images other than the specific partial image can be generated through processes similar to those of the specific query vector as shown above.

Thereafter, the specific query vector generated as such may be transmitted to the feature fingerprint DB 120, and then compared with the data vectors stored in the feature fingerprint DB 120. In the process of the comparison, each of first similarity scores between each of the data vectors and the specific query vector may be generated, which may be an exponential to the power of a negative of the absolute value of the Euclidean distance between the vectors, i.e., $e^{-|euclidean\ distance|}$, or may be a cosine distance between the vectors. If the similarity scores are generated by using the Euclidean distance, it will be as shown below.

$$S=e^{-|Q-D|}$$

Herein, Q may be the specific query vector and D may be one of the data vectors.

In the query vectors, the components with "not present" are not used for calculating the first similarity scores, and only the data vectors including every component that does not correspond to "not present" in the query vectors may be used for calculating the first similarity scores.

Taking an example in FIG. 2, the example query vector in FIG. 2 and the data vectors, corresponding to each of car brands, stored in the feature fingerprint DB 120 are compared. In the feature fingerprint DB 120, duplicate data vectors of Hyundai class are stored, and these are data vectors for vehicles in the Hyundai class whose images are taken from various viewpoints. This is because such a configuration of the feature fingerprint DB 120 allows detection of the objects without regard to the viewpoints on the objects. The example query vector in FIG. 2 may be used for calculating the first similarity scores with the data vectors of Citroen and Audi, as aforementioned.

After calculation of the similarity scores for the specific query vector, if a maximum of the first similarity scores is equal to or greater than the first prescribed threshold, the object detecting system 100 may output a class corresponding to the maximum as the class of a specific object corresponding to the specific query vector. If a maximum of the first similarity scores is less than the first prescribed threshold, the specific partial image may be stored in the unknown image DB 130, and the object detecting system 100 may transmit a log representing that a result of the object detection of the input image is not successful to the programmer.

If the partial images, like the input images, are stored in the unknown image DB 130, then the object detecting system 100 may perform the short-term update. This is explained by referring to FIG. 3.

Figure 3:
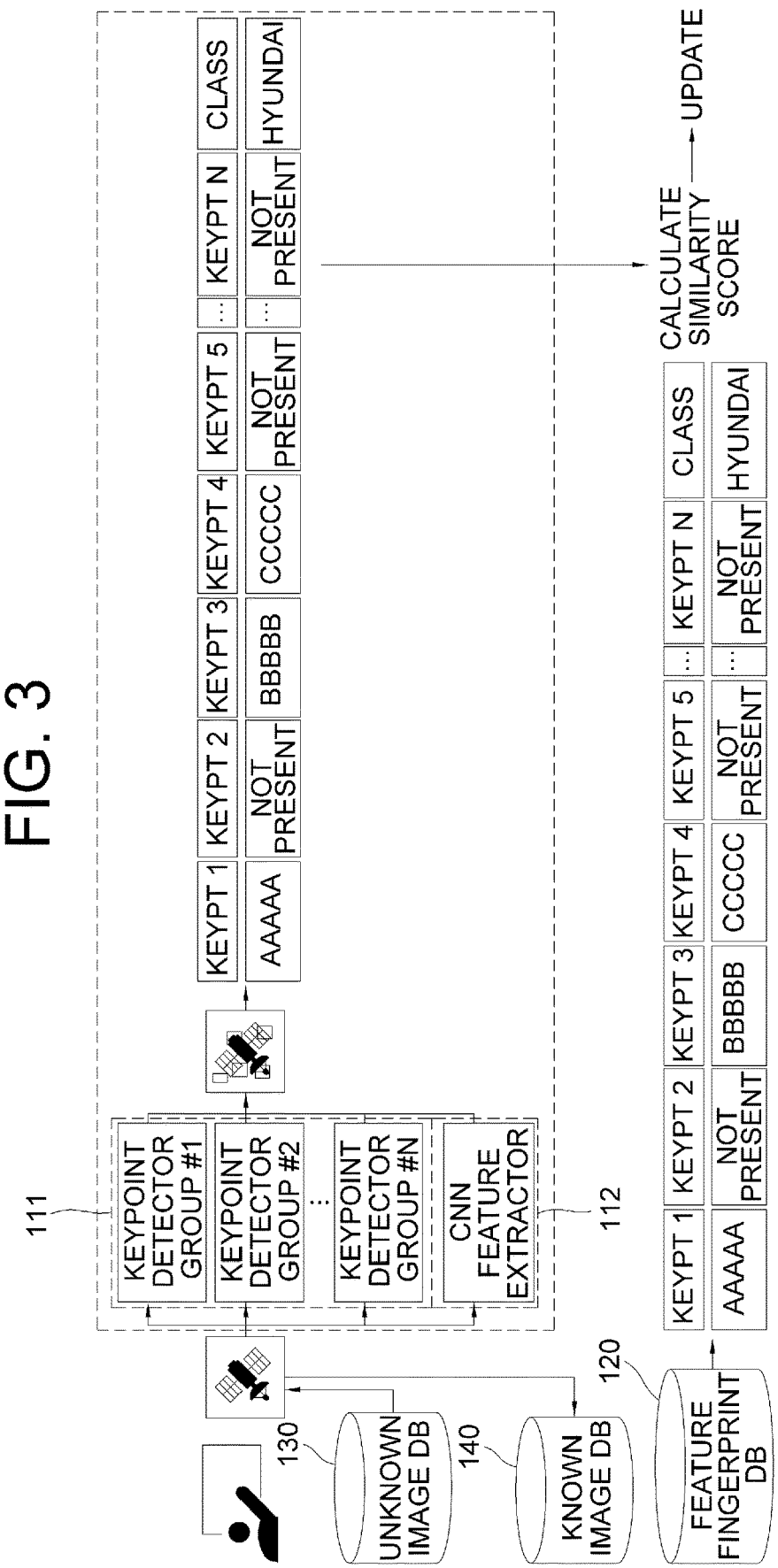
FIG. 3 is a drawing schematically illustrating a process of performing a short-term update of the object detecting system capable of updating the types of the detectable classes in real-time in accordance with one example embodiment of the present disclosure.

FIG. 3 is a drawing schematically illustrating a process of performing the short-term update of the object detecting system 100 capable of updating the types of the detectable classes in real-time in accordance with one example embodiment of the present disclosure.

By referring to FIG. 3, the programmer may confirm the images stored in the unknown image DB 130, and may determine and input the classes of the images. Such an update set including the images stored in the unknown image and their corresponding additional class information may be transmitted to the known image DB 140 and used during the long-term update to be described later. Also, the update set may be transmitted to the recognizer 110 and used during the short-term update.

The recognizer 110 may acquire the update set and generate short-term update vectors. Specifically, the recognizer 110 may add the additional class information to element vectors generated in the same or similar way to the process of creating the query vectors aforementioned, to thereby generate the short-term update vectors by using the images in the update set. In one example embodiment, the query vectors can be stored in the known image DB 140 together, and such query vectors can be used when performing the short-term update. That is, the query vectors and the element vectors are basically the same. Thereafter, the short-term update vector may be transmitted to the feature fingerprint DB 120.

First, if no class in the additional class information corresponds to any of the data vectors stored in the feature fingerprint DB 120 for a specific short-term update vector, then it means that a specific object corresponding to the class of the specific short-term update vector is detected for the first time, thus for future detection of an object of the same class, the specific short-term update vector may be stored in the feature fingerprint DB 120 as a new data vector corresponding to the new class.

But if the class in the additional class information corresponds to one of the data vectors stored in the feature fingerprint DB 120, then the class has been detected before but is not detected due to its improper data vector, thus a set of the data vectors corresponding to the class may be updated. Herein, a process below may determine whether the specific short-term update vector is added as the new data vector corresponding to the class, or existing data vectors are updated.

The object detecting system 100 may compare each of values in a specific short-term update vector and its corresponding value in the data vectors, to thereby generate each of second similarity scores corresponding to each of the data vectors, in the way similar to the processes aforementioned. Herein, if there is no data vector with the second similarity score equal to or greater than a second prescribed threshold, then the short-term update vector may be added as a new data vector corresponding to the class. However, if there is a target data vector with the similarity score equal to or greater than the second prescribed threshold, then the target data vector may be updated by using the short-term update vector.

More specifically, the object detecting system 100 may instruct the short-term update unit to select a largest one among the second similarity scores. And, if the selected largest second similarity score is larger than or same as the second threshold value, the object detecting system 100 may instruct the short-term update unit to update a target data vector corresponding to the largest second similarity score by using the specific short-term update vector. Instead, if the largest second similarity score is smaller than the second threshold value, the object detecting system 100 may instruct the short-term update vector to add the specific short-term update vector to the feature fingerprint DB.

How the target data vector is updated by using the short-term update vector will be explained. Assuming that the target data vector includes N target element and the specific short-term update vector includes N update elements, the object detecting system 100 may instruct the short-term update unit to substitute a K-th target element, wherein K is an integer between 1 and N, with a K-th update element, if the K-th target element corresponds to a first notation representing non-existence of data while the K-th update element corresponds to a second notation representing a certain value. Or, if the K-th target element corresponds to the second notation while the K-th update element corresponds to the first notation, the object detecting system 100 may instruct the short-term update unit to maintain the K-th target element. In other cases, for example if the K-th target element and the K-th update element both corresponds to the second notation, the object detecting system 100 may instruct the short-term update unit to update the K-th target element with a weighted sum of the K-th target element and the K-th update element, and if the K-th target element and the K-th update element both corresponds to the first notation, the object detecting system 100 may instruct the short-term update unit to maintain the K-th target element.

Briefly, if a component "not present" of the data vector is not "not present" in the short-term update vector, the component of the data vector may be updated to have the corresponding value of the short-term update vector. If neither of the corresponding components is "not present", then those components may be updated by using a weighted sum of the both components. Although objects of a new class may be detected and detection of objects of the existing classes may be improved by the short-term update, the long-term update for further optimization is described as follows.

Figure 4:
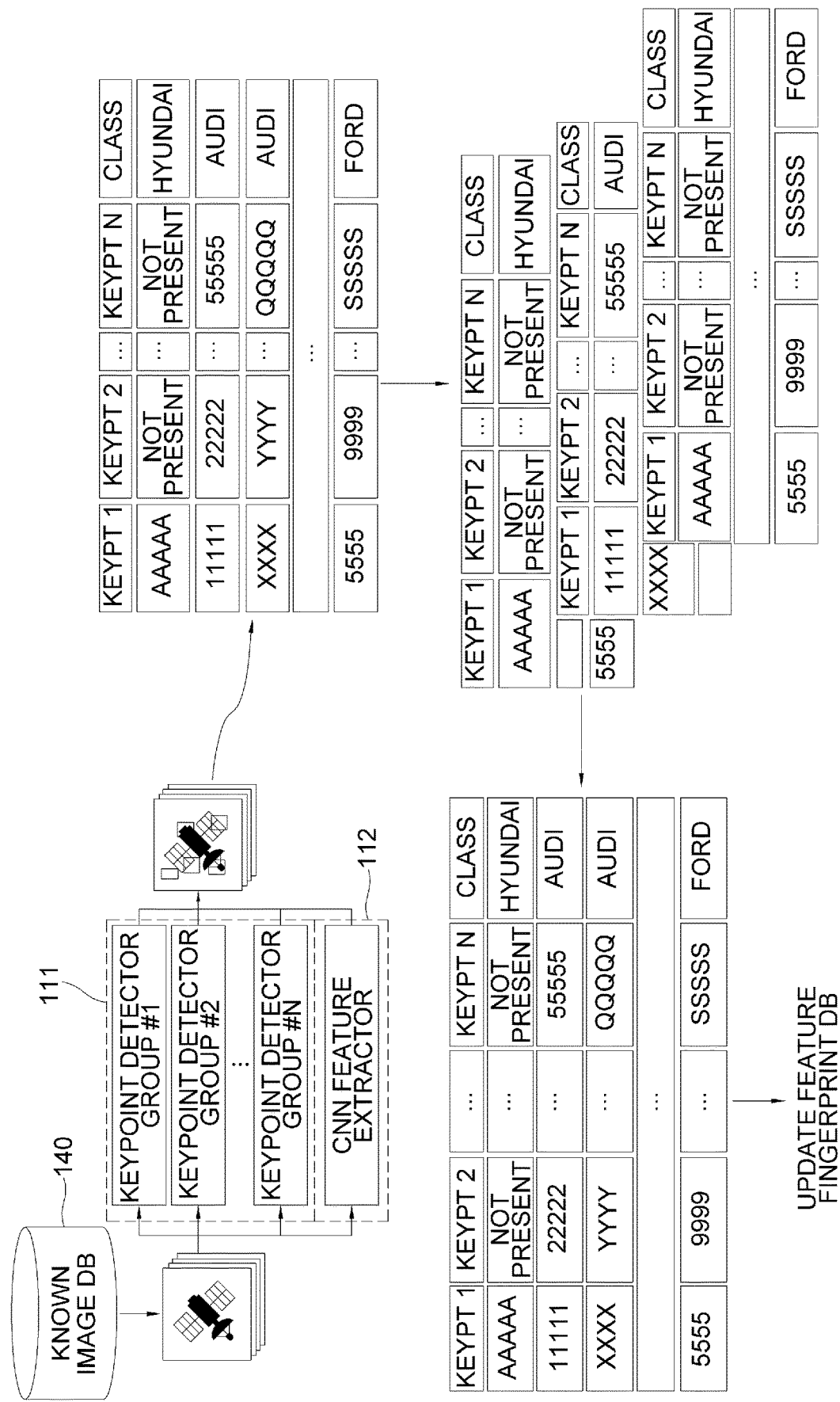
FIG. 4 is a drawing schematically illustrating a process of performing a long-term update of the object detecting system capable of updating the types of the detectable classes in real-time in accordance with one example embodiment of the present disclosure.

FIG. 4 is a drawing schematically illustrating a process of performing the long-term update of the object detecting system 100 capable of updating the types of the detectable classes in real-time in accordance with one example embodiment of the present disclosure.

By referring to FIG. 4, the long-term update may be performed by using the images stored in the known image DB 140. The known image DB 140 may have several update sets having been used for the short-term update. For the long-term update, the object detecting system 100 may instruct the recognizer 110 to generate at least one long-term update vector by using the update sets. Herein, the long-term updates vector may be generated in the way similar to that of the short-term update vectors. That is, each of the long-term update vectors may also include (i) values corresponding to the keypoint detectors and (ii) class information including the image. Or, the short-term update vectors themselves can be used as the long-term update vectors, moved to the known image DB 140 from the unknown image DB 130 after used by the short-term update unit.

The long-term update vectors as such may go through a process of integrating vectors corresponding to the same class. That is, among the vectors corresponding to the same class, each of their components may be updated and integrated by using weighted sums of each. For example, suppose that three vectors corresponding to a specific class are (1a, 0, 3a, 0, 5a), (1b, 2b, 0, 0, 5b), and (0, 2c, 0, 0, 5c). The part for the class information is omitted, and components with "not present" are shown as 0. Herein, for example, the integrated vector may be calculated as ((1a+2b)/2, (2b+2c)/2, (3a), 0, (5a+5b+5c)/3). The feature fingerprint DB 120 may be optimized by updating the feature fingerprint DB 120 such that the vectors integrated for each class are stored in the feature fingerprint DB 120. Herein, some of the long-term update vectors with same class information and third similarity scores between themselves larger than a prescribed third threshold value, may be selected to be merged in order to optimize the updating processes. Processes of calculating the third similarity scores may be same as or similar to those of calculating the first and second similarity scores.

As a result, the autonomous vehicles may be safely operated by optimizing the feature fingerprint DB 120 and updating the newly detected classes.

The present disclosure directs to a method for providing an object detecting system 100 capable of updating types of detectable classes in real-time by using a continual learning. Since the object detecting system 100 can detect new kind of objects owing to the continual learning, it can be used for updating a HD map, a surveillance system, and a product detecting system of a smartphone. The present disclosure specifically explains how to configure the object detecting system 100 with low cost of re-learning parameters and updating re-learned parameters. For example, key regions may be extracted from objects included in an image, and feature maps corresponding to the key regions may be compared to feature maps included in a DB to thereby detect objects.

The present disclosure has an effect of allowing safe driving of the autonomous vehicle which has been operated for a long period of time by providing the object detecting system 100 capable of updating the types of the detectable classes in real-time.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for updating an object detecting system to detect objects with untrained classes in real-time, comprising steps of:
   (a) the object detecting system, if at least one input image is acquired, instructing a recognizer included therein to generate a specific feature map corresponding to a specific ROI including a specific object of the input image, and to generate a specific query vector corresponding to the specific object by using the specific feature map;
   (b) the object detecting system instructing a similarity determining unit (i) to compare the specific query vector to one or more data vectors included in at least one feature fingerprint DB, which is used for detecting objects of images to be inputted thereto, to thereby calculate each of one or more first similarity scores between the specific query vector and each of the data vectors, and (ii) to add a specific partial image corresponding to the specific ROI to an unknown image DB, which is used for updating the feature fingerprint DB, if a specific first similarity score, which is the largest among the first similarity scores, is smaller than a predetermined first threshold value;

(c) the object detecting system, if specific class information corresponding to the specific partial image is acquired, instructing a short-term update unit to generate a specific short-term update vector corresponding to the specific object by using the specific class information and a specific element vector corresponding to the specific object, generated by the recognizer, and update the feature fingerprint DB by using the specific short-term update vector.

2. The method of claim 1, wherein, at the step of (c), the object detecting system instructs the short-term update unit (i) to calculate each of one or more second similarity scores between the specific short-term update vector and specific data vectors, among the data vectors, whose class information is same as that of the specific short-term update vector, (ii) to select a largest one among the second similarity scores, (iii-1) if the largest second similarity score is larger than or same as a predetermined second threshold value, to update a target data vector corresponding to the largest second similarity score by using the specific short-term update vector, and (iii-2) if the largest second similarity score is smaller than the second threshold value, to add the specific short-term update vector to the feature fingerprint DB, to thereby update the feature fingerprint DB.

3. The method of claim 2, wherein, at the step of (c), the object detecting system, if the largest second similarity score is larger than or same as the second threshold value, (1) instructs the short-term update unit to compare each of target elements, including a first target element to an N-th element, included in the target data vector, with each of update elements, including a first update element to an N-th update element, included in the specific short-term update vector, and (2) instructs the short-term update unit to (i) substitute a K-th target element, wherein K is an integer between 1 and N, with a K-th update element, if the K-th target element corresponds to a first notation representing non-existence of data while the K-th update element corresponds to a second notation representing a certain value, (ii) maintain the K-th target element, if the K-th target element corresponds to the second notation while the K-th update element corresponds to the first notation, (iii) update the K-th target element with a weighted sum of the K-th target element and the K-th update element if the K-th target element and the K-th update element both correspond to the second notation, and (iv) maintain the K-th target element, if the K-th target element and the K-th update element both correspond to the first notation.

4. The method of claim 1, wherein, at the step of (c), the object detecting system instructs the short-term update unit to add the specific short-term update vector to the feature fingerprint DB if there are no specific data vectors, among the data vectors, whose class information is same as that of the specific short-term update vector.

5. The method of claim 1, wherein the method further comprises a step of:
(d) the object detecting system instructing a long-term update unit to generate one or more long-term update vectors corresponding to one or more partial images, including the specific partial image, and their corresponding class information representing classes of one or more objects included therein, which were stored in at least one known image DB after used by the short-term update unit, and to further update the feature fingerprint DB by using the long-term update vectors, wherein each of the long-term update vectors includes a reference part including one or more values generated by the recognizer using each of the partial images and a class part including at least one value representing each of the class information.

6. The method of claim 5, wherein, at the step of (d), the object detecting system instructs the long-term update unit (i) to calculate one or more third similarity scores among each of the long-term update vectors, (ii) to merge some of the long-term update vectors whose class information is same as each other in order to generate one or more integrated long-term update vectors, and add the integrated long-term update vectors and remaining long-term update vectors which were not merged, to the feature fingerprint DB, to thereby update the feature fingerprint DB.

7. The method of claim 1, wherein, at the step of (b), the object detecting system instructs the similarity determining unit to calculate one of the first similarity scores by using a formula below:

$$S=e^{-|Q-D|}$$

wherein Q is the specific query vector and D is one of the data vectors.

8. The method of claim 1, wherein, at the step of (a), the object detecting system (i) instructs an RPN corresponding to the recognizer to detect the specific ROI included in the input image, (ii) instructs one or more keypoint detectors corresponding to the recognizer to detect one or more key regions on the specific partial image corresponding to the specific ROI, (iii) instructs a feature extractor corresponding to the recognizer to generate the specific feature map by using the specific partial image, and (iv) instructing the recognizer to generate the specific query vector by using values corresponding to the key regions in the specific feature map.

9. The method of claim 1, wherein the feature extractor includes one or more convolutional layers having one or more convolutional neurons, and it extracts the specific feature map from the specific partial image by instructing each of the convolutional neurons to apply convolutional operations to its inputted values by using its own parameters and deliver its results to its next neuron,
and wherein the parameters are determined through training processes performed before the step (a).

10. An object detecting system capable of updating itself to detect objects with untrained classes in real-time, comprising:
at least one memory that stores instructions; and
at least one processor configured to execute the instructions to perform processes of: (I) if at least one input image is acquired, instructing a recognizer included therein to generate a specific feature map corresponding to a specific ROI including a specific object of the input image, and to generate a specific query vector corresponding to the specific object by using the specific feature map; (II) instructing a similarity determining unit (i) to compare the specific query vector to one or more data vectors included in at least one feature fingerprint DB, which is used for detecting objects of images to be inputted thereto, to thereby calculate each of one or more first similarity scores between the specific query vector and each of the data vectors, and (ii) to add a specific partial image corresponding to the specific ROI to an unknown image DB, which is used for updating the feature fingerprint DB, if a specific first similarity score, which is the largest among the first similarity scores, is smaller than a predetermined first threshold value; (III) if specific class information corresponding to the specific partial image is acquired, instructing a short-term update unit to generate a specific short-term update vector corresponding to the specific object by using the specific class information and a specific element vector corresponding to the specific object, generated by the recognizer, and update the feature fingerprint DB by using the specific short-term update vector.

11. The object detecting system of claim 10, wherein, at the process of (III), the processor instructs the short-term update unit (i) to calculate each of one or more second similarity scores between the specific short-term update vector and specific data vectors, among the data vectors, whose class information is same as that of the specific short-term update vector, (ii) to select a largest one among the second similarity scores, (iii-1) if the largest second similarity score is larger than or same as a predetermined second threshold value, to update a target data vector corresponding to the largest second similarity score by using the specific short-term update vector, and (iii-2) if the largest second similarity score is smaller than the second threshold value, to add the specific short-term update vector to the feature fingerprint DB, to thereby update the feature fingerprint DB.

12. The object detecting system of claim 10, wherein, at the process of (III), the processor, if the largest second similarity score is larger than or same as the second threshold value, (I) instructs the short-term update unit to compare each of target elements, including a first target element to an N-th element, included in the target data vector, with each of update elements, including a first update element to an N-th update element, included in the specific short-term update vector, and (II) instructs the short-term update unit to (i) substitute a K-th target element, wherein K is an integer between 1 and N, with a K-th update element, if the K-th target element corresponds to a first notation representing non-existence of data while the K-th update element corresponds to a second notation representing a certain value, (ii) maintain the K-th target element, if the K-th target element corresponds to the second notation while the K-th update element corresponds to the first notation, (iii) update the K-th target element with a weighted sum of the K-th target element and the K-th update element if the K-th target element and the K-th update element both correspond to the second notation, and (iv) maintain the K-th target element, if the K-th target element and the K-th update element both correspond to the first notation.

13. The object detecting system of claim 10, wherein, at the process of (III), the processor instructs the short-term update unit to add the specific short-term update vector to the feature fingerprint DB if there are no specific data vectors, among the data vectors, whose class information is same as that of the specific short-term update vector.

14. The object detecting system of claim 10, wherein the processor is configured to further perform a process of:

(IV) instructing a long-term update unit to generate one or more long-term update vectors corresponding to one or more partial images, including the specific partial image, and their corresponding class information representing classes of one or more objects included therein, which were stored in at least one known image DB after used by the short-term update unit, and to further update the feature fingerprint DB by using the long-term update vectors, wherein each of the long-term update vectors includes a reference part including one or more values generated by the recognizer using each of the partial images and a class part including at least one value representing each of the class information.

15. The object detecting system of claim 14, wherein, at the process of (IV), the processor instructs the long-term update unit (i) to calculate one or more third similarity scores among each of the long-term update vectors, (ii) to merge some of the long-term update vectors whose class information is same as each other in order to generate one or more integrated long-term update vectors, and add the integrated long-term update vectors and remaining long-term update vectors which were not merged, to the feature fingerprint DB, to thereby update the feature fingerprint DB.

16. The object detecting system of claim 10, wherein, at the process of (II), the processor instructs the similarity determining unit to calculate one of the first similarity scores by using a formula below:

$$S = e^{-|Q-D|}$$

wherein Q is the specific query vector and D is one of the data vectors.

17. The object detecting system of claim 10, wherein, at the process of (I), the processor (i) instructs an RPN corresponding to the recognizer to detect the specific ROI included in the input image, (ii) instructs one or more keypoint detectors corresponding to the recognizer to detect one or more key regions on the specific partial image corresponding to the specific ROI, (iii) instructs a feature extractor corresponding to the recognizer to generate the specific feature map by using the specific partial image, and (iv) instructing the recognizer to generate the specific query vector by using values corresponding to the key regions in the specific feature map.

18. The object detecting system of claim 10, wherein the feature extractor includes one or more convolutional layers having one or more convolutional neurons, and it extracts the specific feature map from the specific partial image by instructing each of the convolutional neurons to apply convolutional operations to its inputted values by using its own parameters and deliver its results to its next neuron, and wherein the parameters are determined through training processes performed before the process (I).

\* \* \* \* \*